Patented June 3, 1941

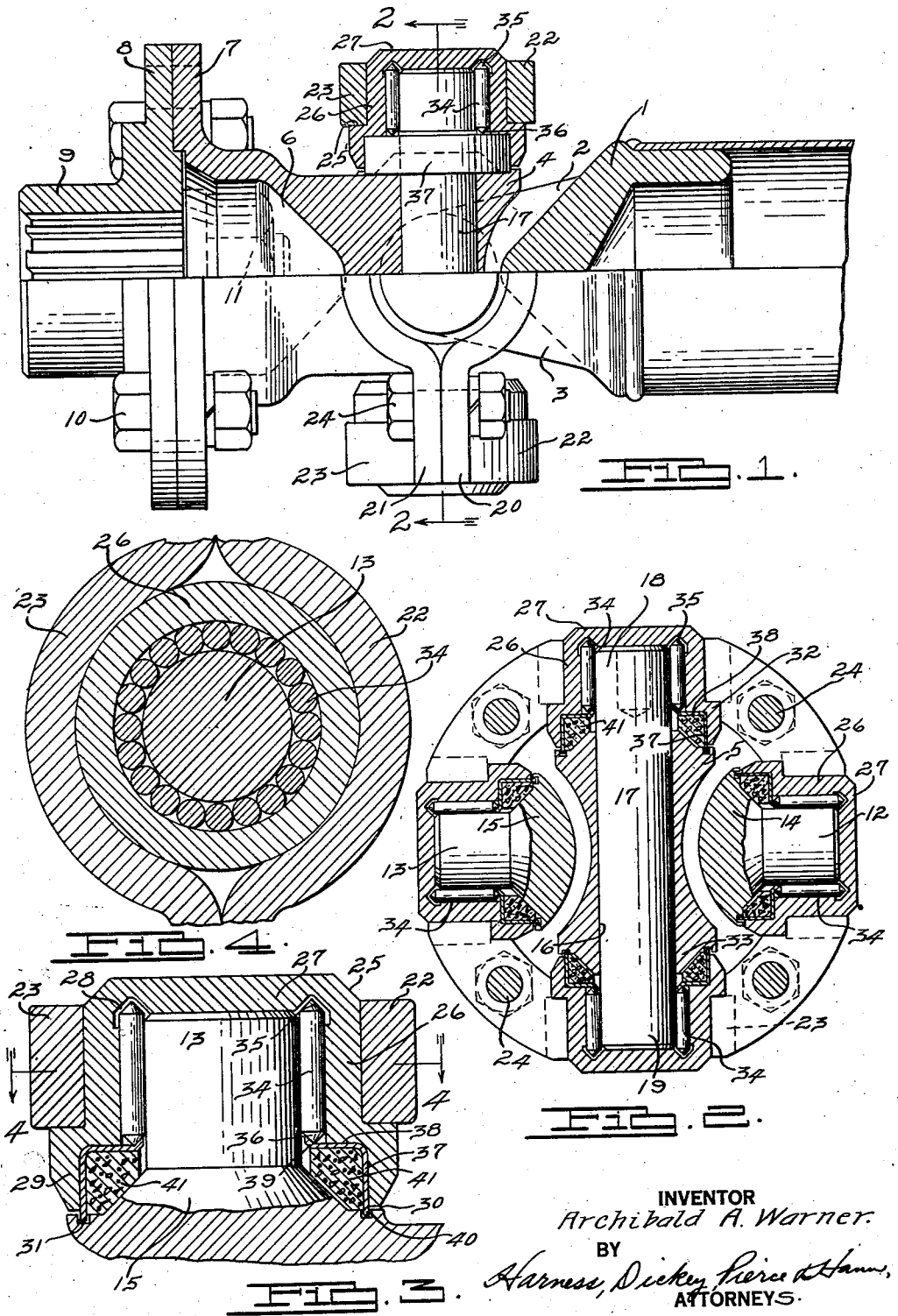

2,244,379

UNITED STATES PATENT OFFICE 2,244,379

UNIVERSAL JOINT

Archibald A. Warner, Royal Oak, Mich., assignor to Universal Products Co. Inc.

Application March 23, 1931, Serial No. 524,445

6 Claims. (Cl. 64—17)

This invention relates to universal joints of the four trunnion type and particularly to a universal joint employing anti-friction bearings.

It is the general object of the invention to provide a four trunnion universal joint characterized by its high torque capacity, low cost, small size and weight and by its relative freedom from the necessity of lubrication during service.

Another object of the invention is to provide a four trunnion joint having a novel arrangement of individually sealed trunnion bearings containing cylindrical anti-friction rollers.

Other objects of this invention are to provide improved means for holding the rollers in position around the inner periphery of their bearing cup prior to assembly of the cup on the end of a trunnion; to provide means of this kind which are adapted to prevent unintended removal of the rollers from the bearing cup; to provide a cup-shaped bearing casing which completely encloses the end of the trunnion upon which it is mounted; and to provide improved rolling contact bearings between the trunnions of the driving and driven members of a universal joint and the torque ring by which they are connected together.

An illustrative embodiment of the invention is shown in the accompanying drawing, in which:

Fig. 1 is a view in side elevation, partly in section, showing a universal joint which embodies my invention.

Fig. 2 is a transverse sectional view taken along the line 2—2 of Fig. 1, looking in the direction indicated.

Fig. 3 is an enlarged fragmentary sectional view showing, in detail, a trunnion having a bearing which embodies the invention.

Fig. 4 is a horizontal sectional view taken on the line 4—4 of Fig. 3.

In the form shown, the invention is illustrated in conjunction with a universal joint which includes a rotatable yoke-shaped torque transmitting member 1 having diverging arms 2 and 3 between which is receivable an end portion 4 of a rotatable torque transmitting member 5. The opposite end portion of the member 5 is cylindrical in shape and it is provided with a central recess 6 and a radially extending flange 7 by which it may be conveniently secured to a flange 8 of a splined collar 9, by bolts 10. The splined collar 9 is adapted to receive an end portion of a shaft (not shown) to which it may be secured by a nut 11 adapted to be housed in the recess 6.

Integrally formed on the arms 2 and 3 of the member 1 are diametrically alined, outwardly extending trunnions 12 and 13 having enlarged base portions 14 and 15 respectively. The end portion 4 of the member 5 is provided with a transverse passage 16 through which a pin 17 extends. The pin 17 fits tightly in the passage 16 and protrudes at its respectively opposite ends beyond the side edges of the portion 4 so as to provide trunnions 18 and 19. The trunnions 12 and 13 of the yoke and the trunnions 18 and 19 are located substantially 90 degrees apart and their central axes preferably intersect.

The trunnions are connected together by a torque ring which includes complementary sections 20 and 21, each having four equally spaced, registering, semi-cylindrical depressions or sockets 22 and 23 respectively. The sections 20 and 21 of the torque ring are rigidly clamped together by bolts 24 which extend through registering apertures in those portions of the rings that are located between the depressions 22 and 23. The complementary registering depressions 22 and 23 form four complete rings which are each located substantially 90 degrees apart.

Mounted on each trunnion is a bearing assembly which includes a cup shaped casing 25 having cylindrical side portions 26 located between the inner periphery of the ring formed by the complementary depressions 22 and 23 of the sections 20 and 21 respectively, and the outer periphery of the trunnion. A radial shoulder 25' is provided on the outer side of each cup for seating against the torque ring for holding it against outward movement.

Formed in the end wall 27 of the casing 25 is an annular groove 28 which extends outwardly beyond the inner periphery of the casing providing an undercut recess which renders grinding of the inner periphery of the casing simple and convenient. The open end of the casing 25 has outwardly offset walls 29 which admit portions of the enlarged base part of the trunnion into the interior of the casing. The extremity of this outwardly offset wall 29 of the casing registers with a substantially planular seat 30 on the base portion of the trunnion in which is formed an annular groove 31.

The enlarged base portion of the trunnions 12 and 13 on the member 1 are formed integral with the arms 2 and 3 of the yoke respectively, whereas the base portions 32 and 33 of the trunnions of the member 5 are formed on the thickened end portion 4 of the latter, but they are substantially identical in shape to the base portions of the trunnions 12 and 13.

A plurality of rollers 34 are arranged in a circular series between the adjacent peripheries of the trunnion and the bearing casing. These rollers have tapered, conical, end portions 35 and 36, the inner end portions 35 being received in the annular groove 28 of the end wall 27 of the casing. Pressed in the enlarged open end portion of the casing is a sheet metal sleeve 37 having an inward, radially extending section 38 on which is formed an inclined flange 39 which loosely engages and embraces the tapered ends 36 of the rollers 34. The inclination of the flange 39 is substantially parallel to the inclination of the tapered end portions of the rollers. This inclined flange, in conjunction with the walls of the groove 28 of the end 27 of the casing, holds the rollers 34 against displacement prior to assembly of the bearing unit on the trunnion.

The outer end portion of each sleeve 37 protrudes beyond the open extremity of the casing forming a skirt 40 which is received in the annular groove 31 of the base portion of the trunnion, forming a tortuous path, part of which extends toward the axis of rotation of the joint, whereby entry of dirt to the trunnion bearing is resisted by centrifugal force created by rotation of the joint. A yieldable packing 41, preferably comprising cork or other suitable material, is located between the wall of the enlarged open end portion of the casing and the enlarged base portion of the trunnion. Centering of the joint is secured by contact of the ends of the trunnions against the bottom 27 of the cups or casings 25. Thus these points of contact are at the place of greatest lubrication.

When the above universal joint is rotated during operation, the rolling contact bearings permit the trunnions to turn freely relative to the torque ring. The skirt portions 40 of the sleeves 37 form a tortuous passageway through which it is necessary for dirt to travel in opposition to the centrifugal forces which are created during rotation of the universal joint. In this manner the passage of dirt, or dust laden air into the interior of the bearing is effectively opposed. The member which forms this passageway serves as a retainer for holding the rollers against displacement prior to assembly of the bearing units on the trunnions. The cork gaskets 41 retain a lubricant, such as grease, which is empacked between the rollers, from escaping when the joint is at rest. When the joint is in rotation, centrifugal force prevents the escape of any of the lubricant.

Although but one specific embodiment of this invention has been herein shown and described, it will be understood that numerous details of the construction shown may be altered or omitted without departing from the spirit of this invention as defined by the following claims.

I claim:

1. In a universal joint, a trunnion projecting radially with respect to the axis of the joint and having a shoulder spaced from the end thereof, a bearing cup around the trunnion and having an end thrust bearing engagement with the trunnion to center the joint, cylindrical rollers between the trunnion and the inner surface of the cup and extending parallel to the axis of the trunnion, means adjacent the shoulder of said trunnion defining an annular channel spaced from and opening toward the cup, an annular ring having a press fit within the cup at the open end thereof, said ring having a portion extending axially into the channel and a portion extending radially inwardly into engagement with the rollers, and a packing between the shoulder and a portion of the ring.

2. In a universal joint, a trunnion projecting radially with respect to the axis of the joint, a bearing cup around the trunnion and having an end thrust bearing engagement with the trunnion to center the joint, cylindrical rollers between the trunnion and the inner surface of the cup and extending parallel to the axis of the trunnion, a shoulder on the trunnion adjacent the base thereof, a packing means around said trunnion adjacent the shoulder, means on the cup providing an axial flange spaced radially outwardly of the rollers and extending toward the shoulder, and an annular ring of angular cross section having an axially extending leg press fitted within said means and a radially extending leg extending into engagement with the rollers, said packing means engaging both said legs of the annular ring.

3. In a universal joint, a trunnion projecting radially with respect to the axis of the joint, a closed ended bearing cup around the trunnion and having an end thrust bearing engagement with the trunnion to center the joint, cylindrical rollers between the trunnion and the inner surface of the cup and extending parallel to the axis of the trunnion, means forming an annular channel around the trunnion inwardly of the cup and opening toward the inner edge of the cup, and a ring press fitted on the open end of the cup and extending into the channel in spaced relation to the outer wall thereof.

4. In a universal joint having four radially extending trunnions, a bearing assembly for each trunnion including a bearing cup around the trunnion, cylindrical rollers between the trunnion and the inner surface of the cup and extending parallel with the axis of the trunnion, an end thrust trunnion bearing for centering the joint independently of said rollers, and means adjacent the open end of the cup for sealing the cup against the entrance of dirt and loss of lubricant.

5. In a universal joint having four radially extending trunnions, a bearing assembly for each trunnion including a bearing cup around the trunnion and having an end thrust bearing with the trunnion for centering the joint, cylindrical rollers between the trunnion and the inner surface of the cup and extending parallel with the axis of the trunnion, and means at the open inner end of the cup for sealing the cup against the entrance of dirt and loss of lubricant.

6. In a universal joint having four radially extending trunnions, a bearing assembly for each trunnion including a bearing cup around the trunnion and having an end thrust bearing with the trunnion for centering the joint, cylindrical rollers between the trunnion and the inner surface of the cup and extending parallel with the axis of the trunnion, a roller retaining ring fitted within the open end of said cup and projecting axially inwardly beyond the cup, means at the base of the trunnion defining an annular wall co-axial therewith and projecting outwardly in overlapping relationship to said retaining means, and an annular sealing element between the roller retaining ring and the base of the trunnion.

ARCHIBALD A. WARNER.